United States Patent
Ochikoshi et al.

(10) Patent No.: US 6,627,668 B2
(45) Date of Patent: Sep. 30, 2003

(54) PROCESS FOR PREPARING POLYOLEFIN PRE-EXPANDED PARTICLES

(75) Inventors: Shinobu Ochikoshi, Settsu (JP); Yutaka Yanagihara, Settsu (JP); Naruhiko Akamatsu, Settsu (JP)

(73) Assignee: Kaneka Corporation, Osaka (JP)

( * ) Notice: Subject to any disclaimer, the term of this patent is extended or adjusted under 35 U.S.C. 154(b) by 121 days.

(21) Appl. No.: 09/916,315

(22) Filed: Jul. 30, 2001

(65) Prior Publication Data

US 2002/0045673 A1 Apr. 18, 2002

(30) Foreign Application Priority Data

Aug. 24, 2000 (JP) ........................................ 2000-253947
May 22, 2001 (JP) ........................................ 2001-153102
May 22, 2001 (JP) ........................................ 2001-153103

(51) Int. Cl.$^7$ .................................................. C08J 9/22
(52) U.S. Cl. ........................................... 521/58; 521/56
(58) Field of Search ...................................... 521/58, 56

(56) References Cited

U.S. PATENT DOCUMENTS 4,689,351 A    8/1987    Endo et al. .................. 521/60

FOREIGN PATENT DOCUMENTS

EP    0 780 206 A2    6/1997
EP    1 016 690 A2    5/2000

*Primary Examiner*—Morton Foelak
(74) *Attorney, Agent, or Firm*—Armstrong, Westerman & Hattori, LLP.

(57) ABSTRACT

Pre-expanded particles of polyolefin resin having less fluctuation in expansion ratio, uniform particle size and low expansion ratio are provided without using any volatile foaming agent. The low expansion ratio means 2 to 10 times, preferably 3 to 8 times. Resin particles to be released are uniformly contacted with saturated vapor at the time of pre-expanding polyolefin resin particles by dispersing the resin particles into an aqueous dispersion medium in a closed vessel, heating the resin particles to temperature of at least the softening point of the polyolefin resin and releasing the particles from the closed vessel into an atmosphere of lower pressure than the inner pressure of the closed vessel.

8 Claims, No Drawings

PROCESS FOR PREPARING POLYOLEFIN PRE-EXPANDED PARTICLES

BACKGROUND OF THE INVENTION

The present invention relates to a process for preparing polyolefin resin pre-expanded particles. Specifically, the present invention relates to a process for preparing polyolefin resin pre-expanded particles which can be suitably used as a raw material for in-mold foamed articles. More specifically, the present invention relates to a process for preparing polyolefin resin pre-expanded particles which can be suitably used as a raw material for in-mold foamed articles and which have expansion ratio of 2 to 10 times, preferably 3 to 8 times in the lowest region.

A process for preparing polyolefin pre-expanded particles described below has been conventionally well known (for example, Japanese Unexamined Patent Publication No. 199125/1978). In the process, polyolefin resin particles are at first dispersed into an aqueous dispersion medium in a closed vessel. Next, after allowing the polyolefin resin particles to contain a volatile foaming agent, the particles are heated to at least the softening temperature of the above polyolefin resin. Thereafter by releasing the particles into a lower pressure atmosphere, polyolefin resin pre-expanded particles are prepared. However, when pre-expanded particles are prepared according to this method, the use of the volatile foaming agent results in cost increase. Furthermore, expansion ratio is difficult to be controlled due to large impregnation unevenness of the volatile foaming agent. Also, the expansion ratios of the particles are not uniform. For these reasons, excellent pre-expanded particles cannot be prepared. In addition, there are problems with safety such as combustion and explosion in case where a combustible gas such as propane or butane is used as the volatile foaming agent.

Japanese Unexamined Patent Publication No. 229936/1985 discloses a process for preparing pre-expanded particles wherein polyolefin resin particles are made to contain inorganic gas containing nitrogen as a foaming agent and the particles are released into a lower pressure atmosphere. The above method solves problems of cost increase and safety. However, pre-expanded particles uniform in particle size cannot be prepared according to the method due to fluctuation in expansion ratios caused by irregular temperature of the atmosphere into which the particles are released.

Also, Japanese Unexamined Patent Publication No. 221440/1985 discloses the following preparation process. First, resin particles of an ethylene-propylene random copolymer containing 1 to 12% by weight of ethylene are dispersed into water. Second, inorganic gas is introduced thereto and the particles are heated. Then it is released into a lower pressure atmosphere at an exit velocity of 200 to 500 m/second, thereby expanding the particles. According to the method, however, the exit velocity at the time of releasing the particles to the lower pressure atmosphere is too large to maintain the exit velocity for expansion. As a result, fluctuation in expansion ratios is increased among the pre-expanded particles to be obtained.

Alternatively, Japanese Unexamined Patent Publication No. 106546/1999 discloses the following preparation process. First, a polyolefin resin containing 100 parts by weight of a polyolefin resin and 0.05 to 20 parts by weight of a hydrophilic polymer is heated to obtain particles containing water. Thereafter, at the time of releasing the particles into a lower pressure atmosphere, the particles to be released are contacted with gas of at least 60° C. to prepare pre-expanded particles. However, the method causes to increase the fluctuation in expansion ratios of the pre-expanded particles to be obtained due to insufficient dispersion of the hydrophilic polymer.

SUMMARY OF THE INVENTION

From the viewpoint of the above prior arts, intense studies were conducted as to a process for preparing polyolefin resin pre-expanded particles which have small fluctuation in expansion ratios and uniform particle size at the same time by using water as a main foaming agent instead of a volatile foaming agent. As a result, it has been found that the above problems can be solved by a process for exposing particles to saturated vapor at the time of releasing particles into an atmosphere of lower pressure than the inner pressure of the closed vessel. According to this method, it is possible to obtain pre-expanded particles having an improved expansion ratio, less fluctuation in expansion ratios and more uniform particle size compared with the case where particles are not contacted with saturated vapor.

It has been also found that melt-kneading by using a multi-screw extruder makes it possible to prepare pre-expanded particles having less fluctuation in expansion ratios and more uniform particle size.

Furthermore, another finding is that, by previously preparing a masterbatch comprising a polyolefin resin and a hydrophilic polymer in which the concentration of the hydrophilic polymer is high, and by kneading the masterbatch with the polyolefin resin, dispersability of the hydrophilic polymer can be improved and the fluctuation in expansion ratios can be lowered.

The characteristics of the process for preparing pre-expanded particles of a polyolefin resin of the present invention is to contact particles to be released with saturated vapor at the time of pre-expanding the polyolefin resin by dispersing particles of the polyolefin resin into an aqueous dispersion medium in a closed vessel, heating the resin composition particles to temperature of at least the softening point of the polyolefin resin and releasing the particles from the closed vessel into an atmosphere of lower pressure than the inner pressure of the closed vessel.

The expansion ratio is preferably from 2 to 10 times.

It is preferable to perform expansion by releasing the particles after increasing the inner pressure of the closed vessel by introducing nitrogen, atmospheric air or inorganic gas containing the above nitrogen or atmospheric air as a main component.

The above polyolefin resin is preferably a polypropylene resin.

The temperature of the above saturated vapor is preferably at least the softening temperature to at most the melting point of the above polyolefin resin.

Preferably, the polyolefin resin particles comprise 100 parts by weight of a polyolefin resin and 0.05 to 20 parts by weight of a hydrophilic polymer.

It is preferable to melt-knead the above polyolefin resin composition comprising a polyolefin resin and a hydrophilic polymer by using a multi-screw extruder.

It is preferable that a masterbatch comprising a polyolefin resin and a hydrophilic polymer in which the concentration of the hydrophilic polymer is high is previously prepared and a polyolefin resin is melt-kneaded with the masterbacth by using an extruder.

DETAILED DESCRIPTION

The present invention is used for preparing pre-expanded particles from polyolefin resin particles.

In the present invention, pre-expanded particles of a polyolefin resin are prepared as follows. First, the above polyolefin resin particles are dispersed into an aqueous dispersion medium in a closed vessel. The above resin particles are then heated to the temperature higher than the softening point of the above polyolefin resin. Next, inorganic gas is preferably introduced to the closed vessel and the pressure inside the closed vessel is kept to 0.6 to 7.5 MPa. After that, the above resin is released into an atmosphere of lower pressure than the inner pressure of the closed vessel. The characteristic of the present invention is to contact the released particles with saturated vapor at this time.

Allowed to contact with the released particles, the above saturated vapor is used for reducing and preventing the contraction of particles to be expanded and producing pre-expanded particles having less fluctuation in expansion ratios and more uniform particle size. The temperature of the above saturated vapor is adjusted to preferably at most the melting point of the material resin used for particles to be pre-expanded, more preferably to the temperature range of 90 to 110° C. When the temperature is higher than 110° C. which is near the glass transition temperature or the melting point of the resin, there is a tendency that the cells of the particles to be pre-expanded are broken as well as the particles are melted and adheres to each other. When it is lower than 90° C., the contraction of the particles tends to be larger and the fluctuation in expansion ratios is likely to increase due to sudden coagulation of water in the particles to be expanded. Preferably, the saturated water vapor pressure is set to a saturated water vapor pressure at temperature of at most the melting point of the material resin for particles to be pre-expanded. More preferably the water vapor pressure is 70 to 150 kPa.

At the time of contacting the particles to be pre-expanded with saturated vapor, a preferable method is to attach several blowing vents for steam closely beneath the release nozzle to contact saturated vapor uniformly with each particle to be pre-expanded. The uniform contact of the saturated vapor helps reducing the fluctuation in expansion ratios of each particle.

In this case, it is permitted to use a certain amount of water spray together at the blowing of the water vapor. Alternatively, the process can also involve such an operation as controlling cooling rate of the particles to be expanded by spraying water after the contact with the saturated vapor.

As to the aqueous dispersion medium to which resin composition particles are dispersed, any one can be used as long as the above polyolefin resin composition is not dissolved in the medium. Normally, examples thereof are water or a mixture of water and at least one of ethylene glycol, glycerin, methanol, ethanol, isopropyl alcohol and the like. Water is preferable from environmental and economical viewpoints.

The amount of resin particles dispersed into the above aqueous dispersion medium is preferably 3 to 100 parts by weight, more preferably 10 to 50 parts by weight based on 100 parts by weight of the aqueous dispersion medium. When the amount of the dispersed particles is less than 3 parts by weight, there is a tendency that productivity is decreased and economic efficiency is lowered. When it is more than 100 parts by weight, the particles tend to be melted and adhere to each other in the vessel during heating.

A dispersing agent such as an inorganic dispersing agent or a surfactant is used when the above resin particles are dispersed into an aqueous dispersion medium. Examples of the inorganic dispersing agent are inorganic salts such as potassium tertiary phosphate, basic magnesium carbonate, basic zinc carbonate and potassium carbonate, and clays such as bentonite and kaoline. Among these, potassium tertiary phosphate is preferable because dispersion force is high. On the other hand, examples of the surfactant are anion surfactants such as sodium dodecylbenzenesulfonate, sodium n-paraffinsulfonate, sodium α-olefinsulfonate and sodium alkyl naphthalenesulfonate, and cation surfactants such as benzal conium chloride, alkyltrimethyl ammonium chloride and dialkyldimethyl ammonium chloride. Among these, sodium n-paraffinsulfonate is preferable because it gives excellent dispersion force and can be easily biodegraded.

There is no particular limitation for the amount of these inorganic dispersing agents and surfactants. They are used in usual amount. Specifically, the amount of the inorganic dispersing agent is preferably 0.05 to 10 parts by weight based on 100 parts by weight of the resin particles. The amount of the surfactant is preferably 0.0005 to 1 part by weight based on 100 parts by weight of the resin particles.

The heating temperature for the above resin particles after dispersing the particles into an aqueous dispersion medium in a closed vessel is at least the softening point of the polyolefin resin composition to be used. Preferably, the temperature is at most the melting point plus 20° C., more preferably at least the melting point plus 5° C. to 15° C. For example, in case of using an ethylene-propylene copolymer whose melting point is 145° C., the heating temperature is preferably 145 to 165° C., more preferably 150 to 160° C. When the heating temperature is lower than 145° C., expansion tends to be difficult. When it is higher than 165° C., mechanical properties and heat resistance of the pre-expanded particles to be obtained tend to be insufficient, and the particles are likely to be melted and adhere to each other in the vessel.

The melting point of the polyolefin resin composition is measured by using DSC (differential scanning calorimeter). That is, the melting point means the temperature atop the melting peak which appears when the composition is heated from 40 to 220° C. at a rate of 10° C./minute followed by cooling to 40° C. at 10° C./minute and further heated to 220° C. at 10° C./minute.

It is preferable to introduce inorganic gas into the above closed vessel. Preferable examples of the inorganic gas are nitrogen gas and atmospheric air. Also preferable is inorganic gas which contains the above nitrogen and/or air as a main component (usually at least 50%, especially at least 70% by volume) and inert gas such as argon, helium or xenon, or water vapor, oxygen, hydrogen or ozone in a small amount (at most 50%, especially at most 30% by volume).

The inner pressure of the closed vessel after the introduction of the inorganic gas is preferably 0.6 to 7.5 MPa, more preferably 1.0 to 7.0 MPa as described above. When the above pressure is less than 0.6 MPa, it is likely that the advantage of introducing the inorganic gas is reduced and unexpanded beads seem to be produced. When it is more than 7.5 MPa, cell diameter of the pre-expanded particles becomes microscopic and closed cell content thereof is decrease to cause such tendencies as contraction of molded articles and deterioration of dimensional stability and mechanical strength. As to the timing, the inorganic gas may be introduced before, during or after the heating of the closed vessel.

As to "lower pressure than the inner pressure of the closed vessel", it means that any pressure can be applied as long as it is lower than the inner pressure of the vessel. Usually, the pressure around atmospheric pressure is selected. The above atmosphere means the space where the released mixture of particles and water is spattered. Generally, the atmosphere refers to the interior part of devices such as pipe and duct blocked from outside air.

When the resin particles are released from the closed vessel to the lower pressure atmosphere, it is preferable to maintain the inner pressure of the closed vessel as constant as possible by releasing the particles through a drawing board and introducing inorganic gas or the like into the vessel. Examples of the above drawing board to be used are orifice type, nozzle type, venturi type and the like. These can be also used in combination. As to the release nozzle to be located on the drawing board, any one can be used as long as the nozzle has such a size that the resin particles to be released is not blocked and is capable of achieving pre-determined releasing rate. There is no particular limitation for open area and sectional profile of the releasing nozzle.

By keeping the pressure of the closed vessel as constant as possible and releasing the particles through the drawing board in this way, the releasing rate and the releasing amount can be maintained to a fixed value. As a result, uniform contact between saturated vapor and each resin particle can be achieved, making it possible to obtain uniform pre-expanded particles whose fluctuation in expansion ratios is small.

In addition, the expansion ratio of the particles to be pre-expanded is not particularly limited, but preferably 2 to 10 times, more preferably 3 to 8 times. When it is less than 2 times, there is a tendency that many particles remains unexpanded and thus flexibility and buffering properties of the molded articles to be obtained become insufficient. When it is more than 10 times, improvement on reducing fluctuation in expansion ratio tends to be smaller compared with the case where no saturated vapor is contacted.

The above polyolefin resin contains 50 to 100% by weight, preferably 70 to 100% by weight of an olefin monomer unit and 0 to 50% by weight, preferably 0 to 30% by weight of a monomer unit copolymerizable with the olefin monomer. Since the resin used in the present invention contains at least 50% by weight of the olefin monomer unit, it is possible to obtain molded articles light in weight and excellent in mechanical strength, processability, electrical insulation, water resistance and chemical resistance. The monomer units copolymerizable with the olefin monomer are a component which is used for improving adhesion property, transparency, impact resistance, gas barrier property and the like. To take effect of the use of the copolymerizable monomer units, the component is used in amount of preferably at least 2% by weight, more preferably at least 5% by weight. Examples of the olefin monomer are an α-olefin monomer having 2 to 8 carbon atoms such as ethylene, propylene, butene, pentene, hexene, heptene or octene, a cyclic olefin such as norbornene monomers, and the like. These may be used alone or in combination of two or more. Ethylene and propylene are preferred among them, since they are inexpensive and give the polymers excellent in physical properties.

Examples of the monomer copolymerizable with the olefin monomer are a vinyl alcohol ester such as vinyl acetate, an alkyl (meth)acrylate having a $C_1$ to $C_6$ alkyl group such as methyl methacrylate, ethyl acrylate or hexyl acrylate, vinyl alcohol, methacrylic acid, vinyl chloride, and the like. These may be used alone or in combination of two or more. Among these, vinyl acetate is preferred from the viewpoints of adhesion, flexibility and properties at low temperature, and methyl methacrylate is preferred from the viewpoints of adhesion, flexibility, properties at low temperature and heat stability.

The melt index (MI) of the above polyolefin resin is preferably 0.2 to 50 g/10 minutes, more preferably 1 to 30 g/10 minutes. As to polypropylene resins, for example, their flexural modulus (JIS K 7203) is preferably 5,000 to 20,000 kg/cm² G, more preferably 8,000 to 16,000 kg/cm² G, and their melting point is preferably 125 to 165° C., more preferably 130 to 160° C.

When the above MI is less than 0.2 g/10 minutes, it tends to be difficult to prepare pre-expanded particles having a high expansion ratio since the melt viscosity is too high. When the MI is more than 50 g/10 minutes, it tends to be difficult to prepare pre-expanded particles having a high expansion ratio because cells are easily broken due to low melt viscosity in regard to elongation of the resin at the time of expansion. When the flexural modulus is less than 5,000 kg/cm²G, mechanical strength and heat resistance tend to be insufficient. When flexural modulus is more than 20,000 kg/cm²G, flexibility and cushioning property of the obtained foamed articles tend to be insufficient. When the melting point is less than 125° C., the heat resistance tends to be insufficient. When the melting point is more than 165° C., melt adhesion at molding and secondary expandability tend to be insufficient.

Examples of the above polyolefin resin are a polypropylene resin such as an ethylene-propylene random copolymer, an ethylene-propylene-butene random terpolymer, a polyethylene-polypropylene block copolymer or a propylene homopolymer; a polyethylene resin such as low density polyethylene, medium density polyethylene, high density polyethylene, linear low density polyethylene, an ethylene-vinyl acetate copolymer or an ethylene-methyl methacrylate copolymer; polybutene; polypentene; and the like. The polyolefin resins may be non-crosslinked ones, or may be crosslinked by means of a peroxide or radiation. These polymers may be used alone or in combination of two or more. Among these, polypropylene resins are preferred since they show small fluctuation in expansion ratios and the molded articles made of the obtained pre-expanded particles have excellent mechanical strength and heat resistance as compared with other polyolefin resins.

The above polyolefin resin particles may contain a hydrophilic polymer in the polyolefin resin.

The above hydrophilic polymer refers to polymers whose water absorption measured according to ASTM D570 is at least 0.5% by weight. The polymer includes so-called hygroscopic polymers, water-absorptive polymers (which are water-insoluble, absorb water in an amount of several to several hundreds times the weight of its own, and are not easily dehydrated even under pressure) and water-soluble polymers (which are dissolved in water at ordinary temperature or high temperature). Such hydrophilic polymers may contain, in their molecule, hydrophilic groups such as carboxyl group, a hydroxyl group, an amino group, an amido group, an ester group and a polyoxyethylene group.

Examples of the hygroscopic polymer are carboxyl group-containing polymers, polyamides, thermoplastic polyester elastomers, cellulose derivatives, and the like. These may be used alone or in combination of two or more.

Examples of the water-absorptive polymer are crosslinked polyacrylate salt polymers, starch-acrylic acid graft copolymers, crosslinked polyvinyl alcohol polymers, crosslinked polyethylene oxide polymers, isobutylenemaleic acid copolymer, and the like. These may be used alone or in combination of two or more.

Examples of the water-soluble polymer are poly(meth) acrylic acid polymers, poly(meth)acrylate salt polymers, polyvinyl alcohol polymers, polyethylene oxide polymers, water-soluble cellulose derivatives, and the like. These may be used alone or in combination of two or more.

The hygroscopic polymers, the water-absorptive polymers and the water-soluble polymers may be used alone or in combination of two or more.

The amount of the hydrophilic polymer varies depending on the kind of hydrophilic polymer, but is preferably 0.05 to 20 parts by weight based on 100 parts by weight of the polyolefin resin. When the amount of the hydrophilic polymer is less than 0.05 part by weight, expansion ratio tends to become small. When the amount of the hydrophilic polymer is more than 20 parts by weight, dispersibility of the hydrophilic polymer, heat resistance and mechanical strength of foamed articles tend to be lowered.

The polyolefin resin composition used in the present invention preferably contains a filler such as an inorganic filler and/or an organic filler. The use of such fillers makes it possible to obtain pre-expanded particles having uniform cells and a higher expansion ratio.

Examples of the inorganic filler are talc, calcium carbonate, calcium hydroxide, and the like. Among these talc is preferred from the viewpoint that it can help yielding pre-expanded particles whose fluctuation in expansion ratios is small and which have uniform cells and a relatively high expansion ratio.

The organic fillers are not particularly limited as long as they are in the solid state at temperature of at least the softening point of the polyolefin resin. Examples of the organic filler are fluorocarbon resin powder, silicone resin powder, thermoplastic polyester resin powder, and the like. The filler may be used alone or in combination use of two or more.

The average particle size of the filler is at most 50 $\mu$m, preferably at most 10 $\mu$m. When the average particle size of the filler is at most 50 $\mu$m, pre-expanded particles having uniform cells can be obtained. And molded articles excellent in mechanical strength, flexibility and the like can be obtained from the pre-expanded particles. The average particle size is preferably at least 0.1 $\mu$m, more preferably at least 0.5 $\mu$m from the viewpoints of secondary agglomeration and handling workability.

The amount of the filler is preferably at least 0.001 part by weight, more preferably at least 0.005 part by weight based on 100 parts by weight of the polyolefin resin. When the amount of the filler is at least 0.001 part by weight, it is possible to obtain pre-expanded particles having a relatively high expansion ratio. Meanwhile, the amount is preferably at most 3 parts by weight, more preferably at most 2 parts by weight based on 100 parts by weight of the polyolefin resin. When the amount is at most 3 parts by weight, excellent melt adhesion can be seen at the time of molding the pre-expanded particles. As a result, excellent mechanical strength and flexibility can be given to the molded articles prepared from the above pre-expanded particles.

The polyolefin resin composition containing a polyolefin resin, a hydrophilic polymer, a filler and the like is usually melt-kneaded by using an extruder, a kneader, a Banbury mixer, a roll mill or the like. Then, the resin is preferably formed into resin particles having a desired shape such as cylindrical, ellipsoidal, spherical, cubic or rectangular parallelepipedic one which is appropriate for pre-expansion.

Though there are no particular limitation for preparation conditions of the resin particles and the size of the resin particles, particles obtained by melt-kneading in an extruder usually have a weight of 0.5 to 10 mg/particle. A multi-screw extruder is preferably used for melt-kneading. From an economical point of view, a twin-screw extruder is more preferable. The kneading of a polyolefin resin and a hydrophilic polymer by using a multi-screw extruder enables homogeneous dispersion of the hydrophilic polymer into the polyolefin resin, and then the fluctuation in expansion ratios of the pre-expanded particles to be obtained can be smaller.

For the purpose of dispersing a hydrophilic polymer into a polyolefin resin uniformly, it is preferable to prepare previously a masterbatch comprising the polyolefin resin and high concentration of the hydrophilic polymer. Thereafter, a polyolefin resin and the masterbatch are melt-kneaded by using an extruder. When the concentration of the hydrophilic polymer is low, there is a tendency that uniform dispersion is hardly achieved. For this reason, part of water absorption does not become homogeneous. Consequently, when each particle of the polyolefin resin composition (mini pellet) turns into a pre-expanded particle in the presence of water as a foaming agent, fluctuation in expansion ratios becomes larger. In other words, the prepared pre-expanded particles of the polyolefin resin tend to have inferior quality.

Herein, "the concentration" in the high concentration of the hydrophilic polymer is not particularly specified, as long as it is higher than that of the hydrophilic polymer in the particles of the polyolefin resin composition finally prepared. The concentration is, for example, at least 1 part by weight, preferably at least 5 parts by weight, and more preferably at least 10 parts by weight based on 100 parts by weight of the polyolefin resin.

The masterbatch can be obtained, in the form of pellets, according to the usual processing of heat-kneading such as extrusion, rolling or calendering. However, the method is not limited thereto. First, the masterbatch obtained herein is mixed with a polyolefin resin in a suitable ratio. Then, the mixture is formed into pellets according to the usual processing of heat-kneading such as extrusion, rolling or calendering so that the hydrophilic polymer can be dispersed uniformly. In this case, a multi-screw extruder typified by a twin-screw extruder is preferably used. The extruder is capable of bringing about excellent kneading effect and convenient for achieving uniform dispersion and preparing fine pellets which are uniform in shape.

Meanwhile, foamed articles can also be prepared from the pre-expanded particles obtained according to the process of the present invention as follows. First, the pre-expanded particles are processed for a pre-determined period of time in an autoclave under heat and pressure to conduct air impregnation and the like. Thereafter, the particles are filled into an in-mold foaming die and heated by steam to prepare a foamed article shaped along the die. The thus obtained foamed article has great commercial value, because density unevenness, ratio of dimensional shrinking and shape distortion of the molded article are small owing to the low expansion ratio fluctuation of the pre-expanded particles.

The present invention is explained in detail through Examples and Comparative Examples below, but the present invention is not limited thereto. In the Examples, "part" and "%" mean "part by weight" and "% by weight", respectively, unless otherwise specified.

Expansion Ratio (Dry State)

Pre-expanded particles are weighed in amount of about 3 to 10 g and dried at 60° C. for at least 6 hours. The dry weight (W) of the particles is measured and the volume (v) thereof is then measured by dipping the particles in water, followed by calculation of the true specific gravity ρb=w/v of the pre-expanded particles. Then, based on the ratio of the density (ρr) of the material composition to the true specific gravity (ρb), expansion ratio K=ρr/ρb is calculated.

Expansion Ratio After Air Impregnation

Pre-expanded particles after drying is kept under air pressure of 2 MPa for two hours to make the pressure inside the pre-expanded particles higher than that of the atmospheric air. Foaming ratios are measured and shown by means of the pre-expanded particles whose contraction is recovered completely.

Fluctuation in Expansion Ratio

Fluctuation in expansion ratios are calculated by the following equation:

Fluctuation in expansion ratios $(\%) = (\sigma_m)/K_{av} \times 100$ wherein, $K_{av}$ indicates average expansion ratio calculated by the equation $K_{av} = \Sigma\{K_i \times W_i\}$ based on weight percentage Wi and expansion ratio $K_i$ of the remaining foamed particles after screening through JIS Z 8801 standard screens (of eight kinds, i.e., 3.5, 4, 5, 6, 7, 8, 9, and 10 mesh); and $(\sigma_m)$ indicates standard deviation calculated by the equation $\sqrt{\Sigma} = \{Wi \times (K_{av} - K_i)^2\}$ based on weight percentage Wi and expansion ratio $K_i$ of the remaining foamed particles after screening through JIS Z 8801 standard screens (of eight kinds, i.e., 3.5, 4, 5, 6, 7, 8, 9, and 10 mesh).

Observation of Dispersion State of Hydrophilic Polymer

A micro thin piece of polyolefin resin composition particle is immersed in ruthenium tetraoxide solution to stain the hydrophilic polymer phase alone. Thereafter, the stained hydrophilic polymer phase is observed by using a transmission electron microscope (JEM-1200EX made by JEOL, Ltd.).

EXAMPLES 1 to 3

To 100 parts of a polyolefin resin, i.e. an ethylene-propylene random copolymer (having a density of 0.90 to 0.91 g/cm$^3$, an ethylene content of 3% by weight, a melting point of 145° C., MI of 5.5 g/10 minute and flexural modulus of 10,000 kg/cm$^2$G) was added 0.3 part of talc (whose average particle diameter is 7 μm). The resulting resin mixture was fed to a 50 mmφ single screw extruder, melt-kneaded, extruded through a cylindrical die having a diameter of 1.5 mmφ, and then cooled by water. Thereafter, it was cut by a cutter to give columnar polyolefin resin particles (1.8 mg/particle in weight). The obtained resin particles had a softening point of 63° C., a melting point of 145° C. and a density of 0.90 to 0.91 g/cm$^3$ measured according to JIS K 7112.

A closed autoclave was charged with 100 parts of the obtained resin particles, 0.3 part of calcium tertiary phosphate as an inorganic dispersant and 0.005 part of sodium n-paraffinsulfonate as a surfactant together with 300 parts of water. The content in the vessel was heated to 153.0° C. with stirring. The inner pressure of the vessel, about 0.5 MPa at that time, was then raised to the pressure shown in Table 1 by pressurizing with air over 10 minutes. The content was kept under the pressure for 20 minutes. After that, a valve provided at a lower part of the closed vessel was opened to release the aqueous dispersion (containing the resin particles and the aqueous dispersion medium) into a lower pressure chamber through an orifice having one open part. Closely beneath the orifice is provided a blowing vent for steam so that the water vapor having a vapor pressure of 100 kPa is contacted with the aqueous dispersion to be released at the time of release. The temperature of the blowing vapor read 98.0° C. on a thermograph. During release, heated air was introduced into the closed vessel to keep a fixed temperature and inner pressure in the vessel.

EXAMPLE 4

Resin particles were obtained in the same manner as in Example 1 except for further adding 0.04 part of a hydrophilic polymer (an ionomer in which a carboxyl group forms a salt by means of a sodium ion to cross-link molecules; which comprises 85% of ethylene unit and 15% of methacrylic acid unit with 60% of the methacrylic acid unit forming the salt; and whose water absorbing property is 1%).

The obtained particles had a softening temperature of 63° C., a melting point of 145° C. and a density of 0.90 g/cm$^3$ measured according to JIS K 7112. The same subsequent procedures as in Example 1 were carried out to obtain pre-expanded particles.

EXAMPLE 5

Resin particles were obtained in the same manner as in Example 4 except for adding 0.1 part of a hydrophilic polymer. The obtained particles had a softening temperature of 63° C., a melting point of 145° C. and a density of 0.90 g/cm$^3$ measured according to JIS K 7112. The same subsequent procedures as in Example 1 were carried out to obtain pre-expanded particles.

EXAMPLE 6

Resin particles were obtained in the same manner as in Example 4 except for adding 2 parts t of a hydrophilic polymer. The obtained particles had a softening temperature of 63° C., a melting point of 145° C. and a density of 0.90 g/cm$^3$ measured according to JIS K 7112. The same subsequent procedures as in Example 1 were carried out to obtain pre-expanded particles.

Comparative Example 1 to 2

Resin particles were obtained in the same manner as in Example 1. The same subsequent procedures as in Example 1 were carried out to obtain pre-expanded particles except that vapor was not introduced at the time of the particle release.

Table 1 shows the results of the evaluation conducted in Examples 1 to 6 and Comparative Examples 1 to 2.

TABLE 1

| | Amount of hydrophilic polymer added (parts by weight) | Foaming pressure (MPa) | Water vapor blowing | Foaming ratio (times) | Impregnation ratio (times) | Fluctuation in expansion ratio (%) | Remarks |
|---|---|---|---|---|---|---|---|
| Ex. 1 | 0 | 1.5 | Blown | 3.2 | 3.2 | 10.5 | |
| Ex. 2 | 0 | 2.0 | Blown | 5.1 | 5.1 | 7.8 | |
| Ex. 3 | 0 | 2.5 | Blown | 7.2 | 7.3 | 6.4 | |
| Ex. 4 | 0.04 | 2.0 | Blown | 5.1 | 5.1 | 8.0 | |
| Ex. 5 | 0.1 | 1.5 | Blown | 4.6 | 4.6 | 18.5 | |
| Ex. 6 | 2 | 1.0 | Blown | 4.8 | 4.8 | 24.0 | |
| Com. Ex. 1 | 0 | 2.0 | None | 2.0 | 2.0 | 20.1 | Unexpanded particles found |
| Com. Ex. 2 | 0 | 2.5 | None | 2.2 | 2.2 | 24.3 | Unexpanded particles found |

In an attempt to obtain polyolefin resin pre-expanded particles having low expansion ratio, the obtained pre-expanded particles were inappropriate for in-mold foaming without the vapor introduction as seen from the description in Table 1. This is because fluctuation in expansion ratios was increased and some unexpanded particles were even found though foaming ratio was decreased.

The fluctuation in expansion ratios is also decreased in case of adding a hydrophilic polymer to a polyolefin resin.

It is proved that the object can be accomplished even in the lowest expansion ratio region of 3 to 8 times with small expansion ratio fluctuation according to the present invention.

EXAMPLE 7

Resin particles were obtained in the same manner as in Example 4 except for using an extruder with twin screw which spins in the same direction instead of the 50 mm$\phi$ single screw extruder. The obtained particles had a softening temperature of 63° C., a melting point of 145° C. and a density of 0.90 g/cm$^3$ measured according to JIS K 7112. The same subsequent procedures as in Example 1 were carried out to obtain pre-expanded particles except for setting the pressure of the vessel to the pressure described in Table 2. The results are shown in Table 2.

EXAMPLE 8

By using the resin particles obtained in Example 4, the same subsequent procedures as in Example 7 were carried out to obtain pre-expanded particles. The results are shown in Table 2.

As is clear from Table 2, the obtained pre-expanded particles have less fluctuation in expansion ratios and are more uniform in particle size when the resin particles were melt-kneaded by using the twin-screw extruder. Furthermore, the hydrophilic polymer in the polyolefin resin is uniformly dispersed into the polyolefin resin in the spherical shape.

According to the process of the present invention, it is possible to obtain pre-expanded particles having smaller fluctuation in expansion ratios and practically sufficient appearance by contacting it with water vapor at the time of releasing resin particles.

When the expansion ratio is particularly low, for example, 3 to 8 which is suitable for in-mold foaming, the advantage of the present invention is remarkably revealed and it is possible to obtain excellent in-mold foaming articles.

The pre-expanded particles prepared by melt-kneading a polyolefin resin and a hydrophilic polymer by using a twin-screw extruder have smaller fluctuation in expansion ratio and practically sufficient appearance. The advantage of the present invention is remarkably revealed and it is possible to obtain excellent in-mold foaming articles.

What is claimed is:

1. A process for preparing pre-expanded particles of a polyolefin resin comprising:

dispersing particles of said polyolefin resin into an aqueous dispersion medium in a closed vessel, heating said resin composition particles to temperature of at least the softening point of said polyolefin resin, and releasing said particles from said closed vessel into an atmosphere of lower pressure than the inner pressure of said closed vessel, wherein the released particles are contacted with a saturated vapor having a temperature of at most the melting point of said polyolefin resin at the time of pre-expanding said polyolefin resin.

TABLE 2

| | Extruder | Foaming pressure (MPa) | Foaming ratio (times) | Impregnation ratio (times) | Fluctuation in Expansion ratio (%) | Dispersion state of hydrophilic polymer |
|---|---|---|---|---|---|---|
| Ex. 7 | Twin-screw extruder | 2.7 | 9.3 | 9.5 | 8.0 | Uniformly dispersed in the form of sphere at most 0.5 μm in diameter. |
| Ex. 8 | Single screw extruder | 2.6 | 9.6 | 9.7 | 13.6 | Dispersed in the form of sphere at most about 1 μm in diameter or in the form of rod. |

2. The process of claim 1, wherein expansion ratio is 2 to 10 times.

3. The process of claim 1, wherein expansion is performed by releasing said resin composition particles into an atmosphere of lower pressure than the inner pressure of said closed vessel after increasing the inner pressure of said closed vessel by introducing nitrogen, atmospheric air or an inorganic gas containing nitrogen or atmospheric air as a main component.

4. The process of claim 1, wherein said polyolefin resin is a polypropylene resin.

5. The process of claim 1, wherein temperature of said saturated vapor is at least 90° C. to at most 110° C.

6. The process of claim 1, wherein said polyolefin resin particles comprises 100 parts by weight of a polyolefin resin and 0.05 to 20 parts by weight of a hydrophilic polymer.

7. The process of claim 6, wherein said polyolefin resin composition comprising a polyolefin resin and a hydrophilic polymer is melt-kneaded by using a multi-screw extruder.

8. The process of claim 6, wherein a masterbatch comprising a polyolefin resin and a hydrophilic polymer is previously prepared, concentration of said hydrophilic polymer being high, and wherein a polyolefin resin is melt-kneaded with said masterbatch by using an extruder.

* * * * *